March 7, 1933.  J. WAKSMONCKI  1,900,676
ANIMAL STANCHION
Filed April 16, 1931  3 Sheets-Sheet 2
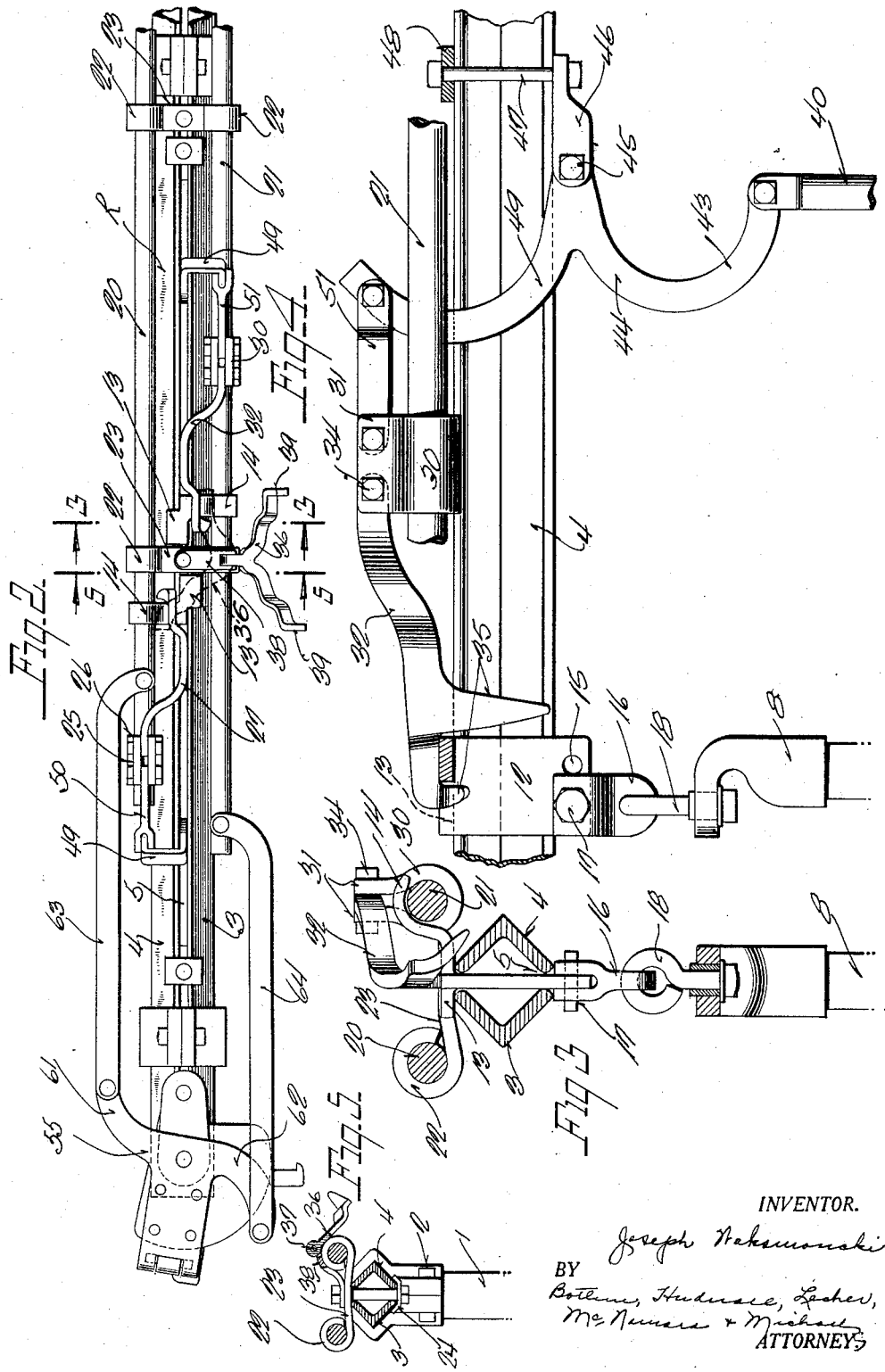
INVENTOR.
Joseph Waksmoncki
BY
ATTORNEYS

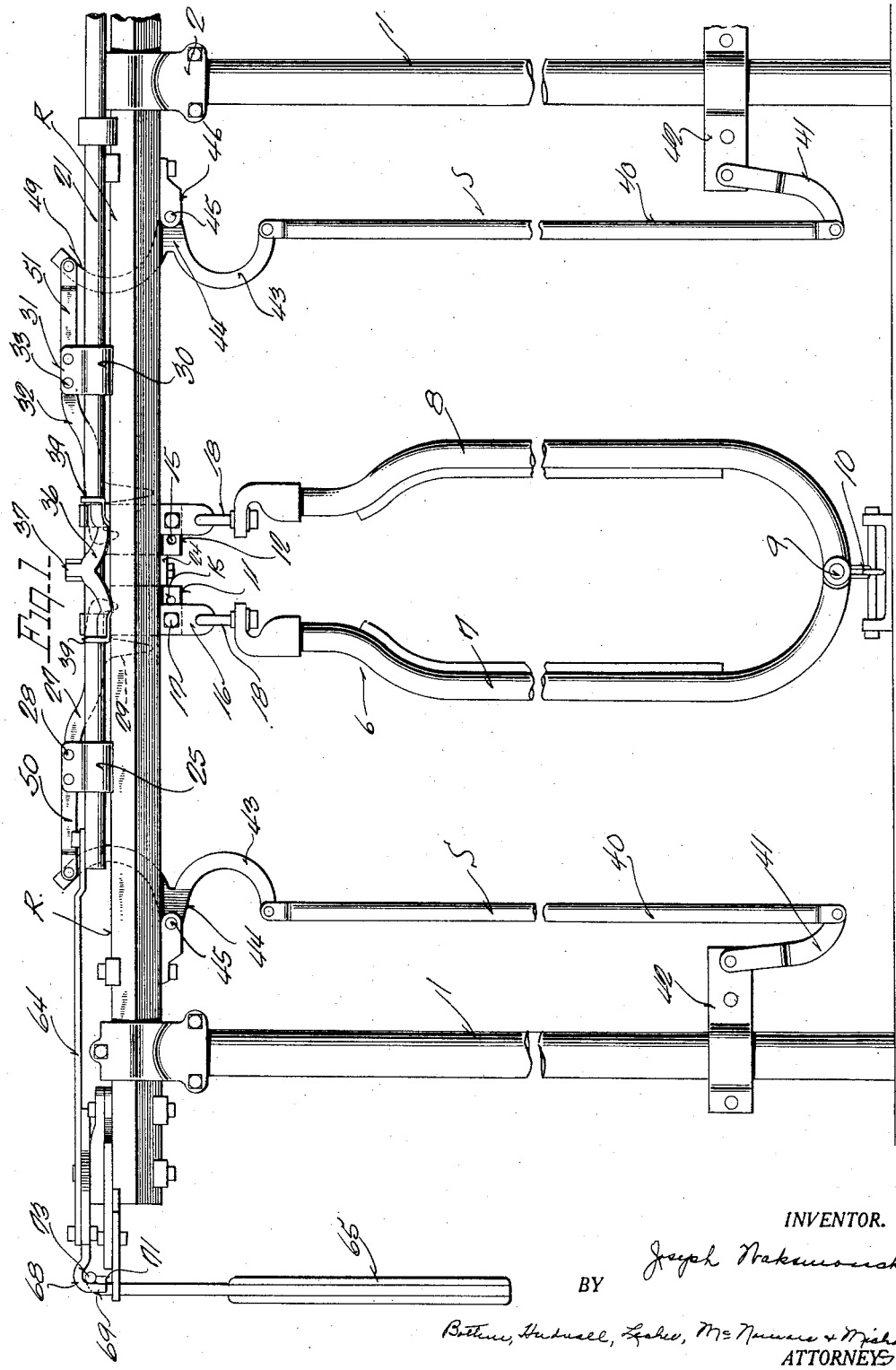

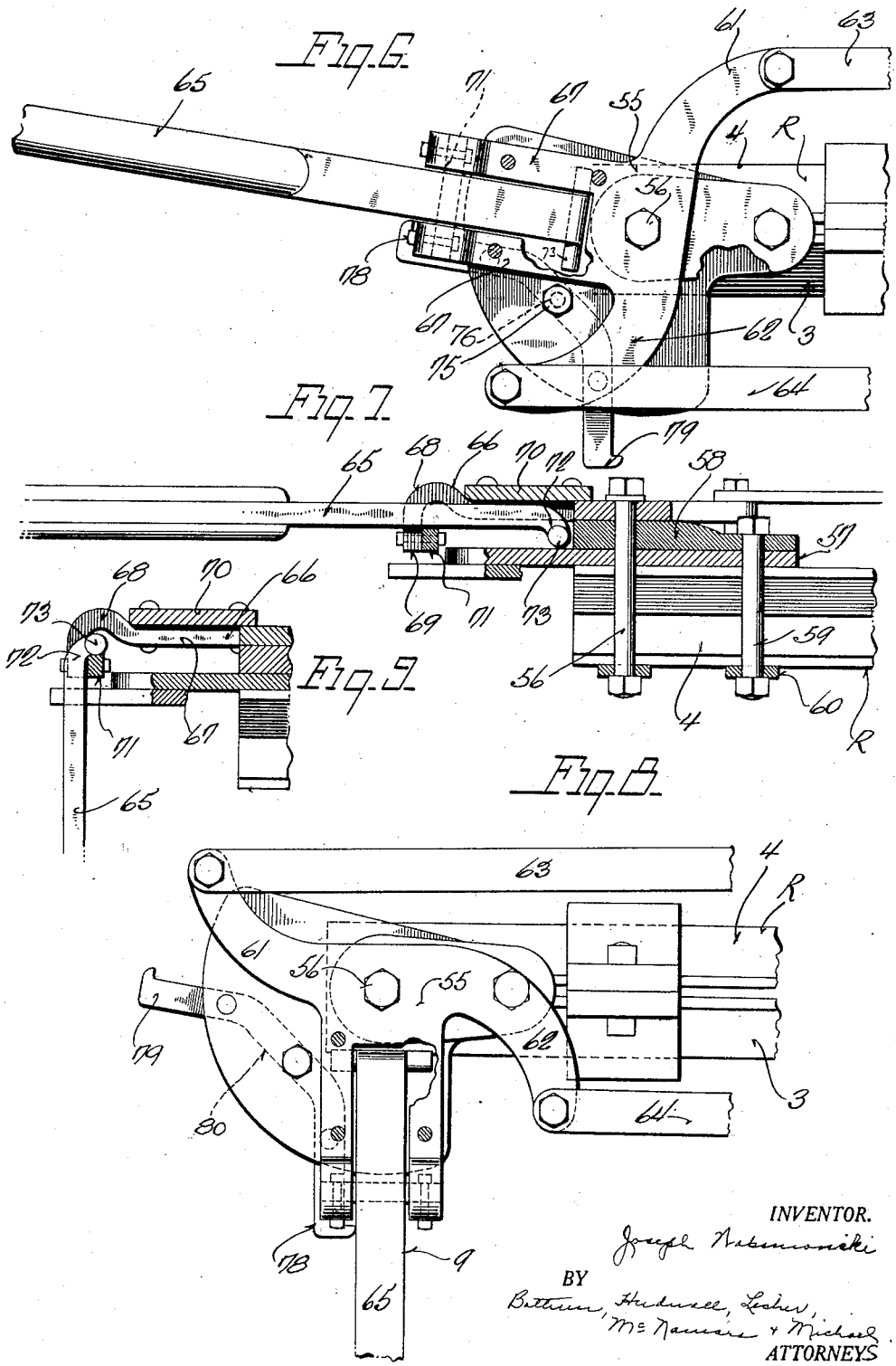

Patented Mar. 7, 1933

1,900,676

UNITED STATES PATENT OFFICE

JOSEPH WAKSMONCKI, OF MOSINEE, WISCONSIN

ANIMAL STANCHION

Application filed April 16, 1931. Serial No. 530,488.

This invention relates to animal stalls such as used in dairy barns and more especially to stalls of this character which have stanchions so constructed and organized as to be operable when desired to prevent the cattle from leaving the stalls although also positionable to release any desired number or all of the cattle when it is desired to free them.

Among the objects of the present invention is the provision of a stall of this character which is of simple and durable construction, reliable and effective in operation and easy and comparatively inexpensive to manufacture. Further, the component parts of the stall and especially those liable to wear or become broken are easily accessible and readily removable so that replacement may be conveniently and quickly effected with a minimum expenditure of labor and skill. Along with these advantages the stanchions are so organized with their operating mechanism that they may be all simultaneously operated from a single operating lever or any selected number of stanchions may be disconnected from the operating line and individually secured in closed position.

Another object of the invention resides in the provision of a novel type of operating means which is constituted to insure full opening or full closing of the stanchions and tends to prevent any accidental intermediate positioning thereof.

Still another object of the invention resides in the organization in the stanchions of sure stops which are connected up with the operating means for the stanchion so that when the stanchions are opened the sure stops are in operative position and tend to insure the entry of the cow into the stanchion whereas when the stanchions are closed the stops are retracted to afford the cow maximum freedom.

Other objects and advantages reside in certain novel features of the construction, arrangement and combination of parts which will be hereinafter more fully described and particularly pointed out in the appended claims, reference being had to the acompanying drawings, forming a part of this specification, and in which:

Figure 1 is a fragmentary view in front elevation showing an animal stall embodying the present invention;

Figure 2 is a top plan view of the structure shown in Figure 1;

Figure 3 is a view in transverse vertical section taken on line 3—3 of Figure 2 and looking in the direction of the arrows:

Figure 4 is a fragmentary view in front elevation and on an enlarged scale and showing the means employed for connecting up one of the operating rods to one of the stanchion members and one of the sure stops, one of the supporting rails being broken away and parts being shown in section for the sake of illustration;

Figure 5 is a fragmentary sectional view taken on line 5—5 of Figure 2 and looking in the direction of the arrows;

Figure 6 is a fragmentary plan view of the operating lever and associated parts, parts being broken away for the sake of illustration;

Figure 7 is a fragmentary view in vertical section taken on line 7—7 of Figure 6, parts being shown in elevation for the sake of simplicity in illustration;

Figure 8 is a fragmentary plan view similar to Figure 6 but showing a different position of the parts; and Figure 9 is a fragmentary sectional view taken on line 9—9 of Figure 8 but showing the lever latched in its vertical position.

Referring to the drawings, it will be seen that an animal stall embodying the present invention comprises posts 1 having suitable clamps 2 at its upper end which are secured to and supported in proper position angle bars 3 and 4, making up the top or supporting rail structure, designated generally at R.

The angle bars are mounted with their flanges at a 45° angle with respect to the horizontal, that is, in the fashion clearly illustrated in Figure 3 and are slightly spaced so that they define between them a lengthwise slot 5.

In between each pair of posts 1 a stanchion designated generally at 6 is provided and consists of stanchion members 7 and 8 appropriately connected together at their lower ends as by a pivot 9. The lower end of each stanchion is also appropriately connected as indicated at 10 to the foundation or base of the stall.

Individual bracket plates 11 and 12 are provided for the stanchion members 7 and 8, respectively, each bracket being slidably supported on the top rail or supporting rail R by virtue of the provision at its upper end of integral outturned wings or lugs designated at 13 and 14. The lower ends of each of these brackets is provided with a plurality of bolt holes 15 to which attaching lugs 16 are selectively secured by means of a bolt and nut 17. Swivels 18 connect the attaching lugs to the upper ends of the stanchion members 7 and 8.

For moving the stanchion members 7 and 8 toward and away from each other, a pair of operating rods designated at 20 and 21 are provided and are slidably supported in the bearing portions 22 of mounting brackets 23, these brackets 23 being fastened by a bolt and nut 24 to the angle bars 3 and 4 as clearly shown in Figure 5. On the operating rod 20 a clamp 25 is secured and has upstanding lugs 26 to one end of which a latch 27 is pivotally secured as indicated at 28. The latch 27 has at one end a double pronged hook formation indicated at 29 and interengageable with the wing 14 of the bracket plate 11 whereby movement of the operating rod 20 in either direction is positively transmitted to the plate 11 and consequently also to the stanchion member 7. Similarly, a clamp 30 is secured to the operating rod 21 and has upstanding lugs 31 to one end of which a latch 32 is pivotally connected as at 33. This latch 32 also has an end of double pronged hook formation as indicated at 35 (see Figure 4) and the two prongs of the hook 35 are designed to embrace the wing 14 of the bracket plate 12, whereby movement of the operating rod 21 in either direction is positively transmitted to the bracket plate 12 and consequently also to the stanchion member 8.

It is obvious that the latches 27 and 32 may be swung around and disengaged from the wings 14 thereby disconnecting the stanchion members 7 and 8 from the operating rods 20 and 21. Under such conditions it is usually desirable to hold the stanchion members 7 and 8 in closed position and for this purpose a locking yoke 36 is provided for each stanchion. The locking yoke 36 has its intermediate portion pivotally supported as at 37 on a mounting strip 38 which is secured to the bearing bracket 23 by the same bolt and nut 24 that secures this bearing bracket in position. The arms of the yoke 36 are formed at their ends with downturned lugs 39 and these lugs 39 in the locking position of the yoke, shown in dotted lines in Figure 2, are interengaged with the wings 14 of the bracket plates 11 and 12. In order that the lugs may engage these wings 14 one of the arms of the yoke is longer than the other and appropriately offset as will be understood from the drawings. It is to be understood that the locking yoke is moved from its released or idle position shown in full lines in Figures 1, 2 and 5 to its locking position shown in dotted lines in Figure 2 by swinging it about its pivot 37 in a counter-clockwise direction, as viewed in Figure 5, until its lugs 39 engage the wings 14 of the bracket plates 11 and 12.

Each stall includes not only a stanchion but also sure stops designated generally at S, there being one sure stop adjacent each post 1. Each sure stop includes a vertical bar 40 having its lower end connected by means of a link 41 to a clamp 42 secured upon the adjacent post. The upper end of each bar 40 is connected to one of the curved arms 43 of a double armed lever 44 fulcrumed as at 45 on a bracket 46 secured to the supporting rail structure R by means of a bolt and nut 47 and cross plate 48 (see Figure 4). The lever 44 at one side of the stall is reversely positioned with respect to the lever 44 at the other side thereof. Each lever 44 has a second curved arm 49 which extends up through the slot formed between the angle bars 3 and 4 of the top rail structure R. Above the top rail structure R these curved arms 49 of the levers 44 are provided with angular portions which are connected by links 50 and 51 to the clamp members 25 and 30, respectively.

From the foregoing it will be understood that when the operating rod 20 is moved to the left while the operating rod 21 is moved to the right, all as viewed in Figures 1 and 2, the stanchion members 7 and 8 will be moved apart and the stop bars 40 will be projected into operative position. Reverse movement of the operating rods brings the stanchion members together and retracts the sure stop.

For simultaneously imparting sliding movement in opposite directions to the operating rods 20 and 21, a crank plate 55 is provided and is pivotally supported by means of a pivot bolt 56 on one end of the supporting rail structure R. A fixed latch plate 57 and a filler plate 58 are interposed between the supporting rail structure R and the crank plate, and these plates 57 and 58 are further secured in position by a bolt and nut 59 and cross plate 60. The crank plate 55 is formed with oppositely extending and reversely curved crank arms 61 and 62 connected by links 63 and 64 to the operating rods 20 and 21, respectively. The crank plate 55 is actuated by means of a hand lever 65. The hand lever is interconnected with the crank plate in a novel manner for the purpose of providing for the securing of the stanchions and stops in either open or closed position and also for the purpose of providing means which tends to preclude the accidental leaving of the stanchion bars and stops in intermediate positions. In carrying out these purposes the crank plate is provided with a slotted extension designated generally at 66 and made up of spaced side pieces 67, the end portions of which are rounded as indicated at 68 and then terminate in downturned end 69. A top plate 70 is secured to the side pieces 67 rearwardly of the rounded portion 68 and coacts with these side pieces to form a socket which snugly fits the lever 65 when the lever is positioned therein. The downturned ends 69 of the side pieces are secured to the end portions of a cross piece 71. The inner end of the lever 65 is downturned as at 72 and provided with outwardly directed lateral extensions 73.

When the lever 65 is thrust inwardly so that its inner end is engaged in the socket constituted by the side pieces 67 and top plate 70, it is retained in a horizontal plane by the action of cross piece 71, top plate 70 and supporting plate 57. Then when the lever 65 is swung horizontally its motion is imparted to the crank plate 55. As soon as the lever 65 has been swung slightly its downturned and extended inner end moves to the rear of the head 75 of a bolt 76 and this prevents withdrawal of the hand lever from the socket and insures interconnection thereof with the crank pin until a complete opening or closing movement has been imparted to the stanchions. In either extreme position the extensions 73 at the inner end of the lever are clear of the head 75. It is obvious in either extreme position the lever 65 may be pulled outwardly and then let fall or move downwardly until it occupies the vertical position shown in Figure 9 at which time it will be engaged with either keeper 78 or keeper 79. These keepers 78 and 79 are formed on the end portion of a strap 80 secured to the plate 57.

While the drawings show only one animal stall embodying the present invention it is obvious that as many stalls are provided as may be desired and that all are constructed exactly like the one shown in the drawings.

The invention claimed is:

1. In an animal stall, a supporting rail structure, a stanchion including a pair of stanchion members, a separate bracket plate for each stanchion member, each bracket plate having means whereby it is adjustably mounted on the supporting rail structure, a pair of operating rods, latches between the operating rods and the brackets and means for shifting the operating rods in opposite directions.

2. In an animal stall, a supporting rail structure, a stanchion including a pair of stanchion members, a separate bracket plate for each stanchion member, each bracket plate being releasably secured to a stanchion member having means whereby it is adjustably mounted on the supporting rail structure, a pair of operating rods, latches between the operating rods and the brackets, means for shifting the operating rods in opposite directions, a sure stop in each stall, and means connected with the operating rods for projecting and retracting the sure stops.

3. In an animal stall, a stanchion including stanchion members movable relatively to each other to open and closed position, operating mechanism for moving said stanchion members, a hand lever for actuating said operating mechanism, means for securing the hand lever in either of its extreme positions and positioned out of its operating plane, and means for preventing movement of the hand lever out of its operating plane in any intermediate position.

4. In an animal stall, a supporting rail structure having a lengthwise slot, mounting plates freely fitted in said slot and having outwardly extending upper portions engageable with the supporting rail structure, the lower ends of the plates projecting below the supporting rail structure, a stanchion including a pair of stanchion members and a releasable connection between each stanchion member and one of said plates.

5. An animal stall comprising a horizontal supporting rail structure having a lengthwise slot, posts supporting said rail structure, a pair of stanchion members suitably connected at their lower ends, an individual mounting bracket for each stanchion member, said brackets being supported on and slidable along said rail structure, a releasable connection between each bracket and its stanchion member, a pair of operating rods supported for sliding movement on said rail structure, means for reversely sliding said rods and releasable connections between said rods and said brackets.

6. In an animal stall, a supporting rail structure, a stanchion including a pair of stanchion members, a separate bracket plate for each stanchion member, each bracket plate having a laterally extending portion and being slidably mounted on the supporting rail structure, a connection between each bracket plate and the stanchion member, a pair of operating rods, and a latch for each bracket plate, each latch being pivotally mounted on an operating rod and having a double pronged hook formation engageable with the laterally extending portion of its bracket plate.

7. In an animal stall, a supporting rail structure, a stanchion including a pair of stanchion members, a separate bracket plate for each stanchion member, each bracket plate having means whereby it is adjustably mounted on the supporting rail structure, a pair of operating rods, a latch between each operating rod and one of said brackets, means for shifting the operating rods in opposite directions, a sure stop in each stall, and reversely positioned double armed levers interconnecting the operating rods and the sure stops for projecting and retracting the sure stops when the stanchion members are opened and closed, respectively.

8. In an animal stall, a supporting rail structure having a lengthwise slot, mounting plates freely fitted in said slot and having outwardly extending upper portions engageable with the supporting rail structure, the lower ends of the plates projecting below the supporting rail structure, a stanchion including a pair of stanchion members and a releasable connection between each stanchion member and one of said plates, operating rods slidable along the supporting rail structure, latches connected to the rods and engageable with the outturned portions of the mounting plates and means for reversely moving the operating rods.

9. In an animal stall, a stanchion including a pair of stanchion members, operating mechanism connected to both stanchion members for positively moving both stanchion members toward and away from each other upon appropriate actuation of said operating mechanism, said operating mechanism including a crank plate having a socket, a hand lever rockably and slidably interconnected with the crank plate operatively connected therewith when slid into position in the socket, and keepers cooperable with the hand lever when it is slid out of the socket and rocked out of the plane of the crank plate.

10. In an animal stall, a stanchion including a pair of stanchion members, operating mechanism connected to both stanchion members for positively moving both stanchion members toward and away from each other upon actuating of said operating mechanism, said operating mechanism including a crank plate having a socket, a hand lever rockably and slidably interconnected with the crank plate operatively connected therewith when slid into position in the socket, keepers cooperable with the hand lever when it is slid out of the socket and rocked out of the plane of the crank plate, and means for holding the hand lever in the plane of the crank plate and entirely within the socket at all times except when the crank plate is positioned to maintain the stanchion members fully open or fully closed.

11. In an animal stall, a supporting rail structure having a lengthwise slot, mounting plates freely fitted in said slot and having outwardly extending upper portions engageable with the supporting rail structure, the lower ends of the plates projecting below the supporting rail structure, a stanchion including a pair of stanchion members, a releasable connection between each stanchion member and one of said plates, and a locking yoke pivotally supported on the supporting rail structure and having downturned lugs cooperable with the outturned portions of the mounting plates for securing them against movement.

In witness whereof, I hereto affix my signature.

JOSEPH WAKSMONCKI.